Patented Sept. 13, 1932

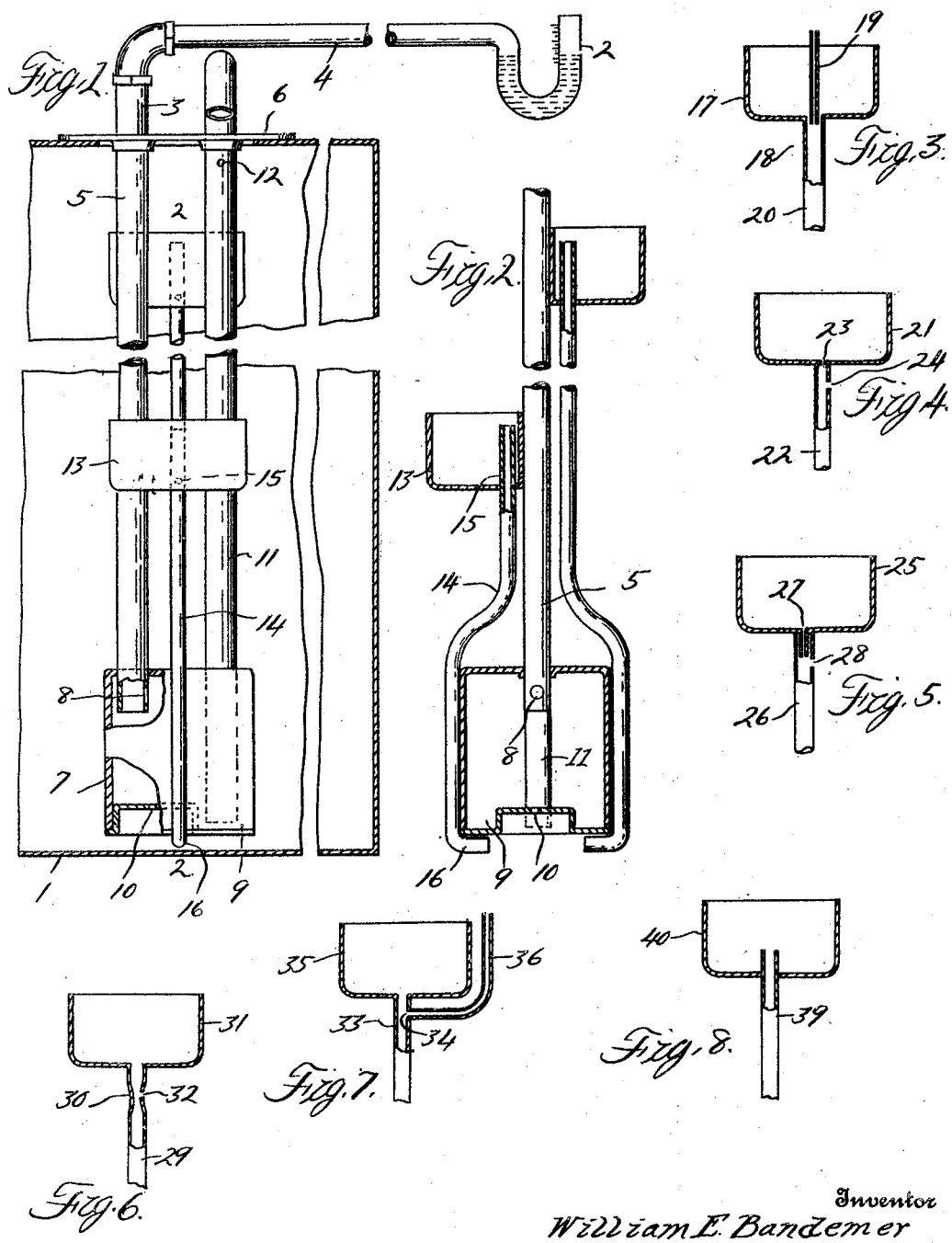

1,876,590

UNITED STATES PATENT OFFICE

WILLIAM E. BANDEMER, OF ANN ARBOR, MICHIGAN, ASSIGNOR TO KING-SEELEY CORPORATION, OF ANN ARBOR, MICHIGAN, A CORPORATION OF MICHIGAN

LIQUID DEPTH INDICATING DEVICE

Application filed August 1, 1927. Serial No. 209,928.

The invention relates to liquid depth indicating devices and refers more particularly to devices for indicating the depth of liquid fuel in supply tanks. One of the objects of the invention is the provision of a simple construction of device which may be economically manufactured and which upon the disturbance of the liquid in the tank automatically replenishes the pressure transmitting conduit with air. Other objects of the invention reside in the novel features of construction and combinations and arrangements of parts as more fully hereinafter set forth.

In the drawing:

Figure 1 is a side elevation, partly broken away, of a liquid depth indicating device embodying my invention;

Figure 2 is a cross section on the line 2—2 of Figure 1;

Figures 3, 4, 5, 6, 7 and 8 are sectional views illustrating different modifications for automatically replenishing the supply of air in the pressure transmitting conduit dependent upon the splashing or surging of the liquid in the tank.

In the present instance, my liquid depth indicating device is applied to the gasoline supply tank 1 upon a motor vehicle and has the pressure gauge 2 which is mounted upon the dash of the motor vehicle and the pressure transmitting conduit 3, which extends from the gauge into the gasoline in the tank 1 and communicates with the gasoline at a pressure transmitting level in the tank. The gauge 2 is preferably a U-gauge containing an indicating liquid with one leg open to the air and the other leg connected to and communicating with the tube 4 forming part of the pressure transmitting conduit 3. 5 is another tube extending through and mounted upon the plate 6, which is secured to the top of the tank 1. The upper end of this tube 5 is connected to and communicates with the tube 4, while its lower end extends air tight through the top of the bell or air chamber 7 and preferably has the opening 8 in its side wall located in the upper portion of the bell for establishing auxiliary communication between the tube 5 and the air chamber 7. The bell 7 has the bottom wall 9 at its lower end, which is provided with the opening 10 therethrough. The tube 5 and bell 7 form with the tube 4, the pressure transmitting conduit 3 and the bell communicates with the gasoline in the tank at the desired pressure transmitting level in the tank, which is preferably near the bottom thereof.

To provide for blowing out the gasoline feed line which connects into the tank and to also provide for quickly filling the tank with gasoline without damaging the pressure gauge, as by forcing the indicating liquid therefrom, I have provided the tube 11, which extends through and is mounted upon the plate 6. This tube depends from the plate substantially parallel to the tube 5 and extends air tight through the top of the bell 7 and has an open lower end terminating adjacent to the bottom wall 9 of the bell and an open upper end located outside and above the tank. The opening 10 in the bottom wall is formed in a raised portion of the bottom wall so that this opening is above the open lower end of the tube 11 and as a consequence the latter does not establish the pressure transmitting or datum level of the device. The tank is also preferably vented through the tube 11, which is provided with the opening 12 below and adjacent to the plate 6.

For the purpose of automatically replenishing the supply of air to the pressure transmitting conduit 3, I have provided a construction making use of the periodic disturbance of the gasoline in the tank 1, which occurs during the movement of the motor vehicle. In detail, I have provided an air replenishing device which comprises the cup 13 having an open upper end and located above the pressure transmiting level in the tank and the liquid conduit 14 extending from the cup to an elevation below the transmitting level in the tank. The cup is preferably secured as by solder to the tubes 5 and 11 and is adapted to receive gasoline. The liquid conduit 14 extends air tight upwardly through the bottom of the cup and has an open upper end providing for the passage of air into the liquid conduit. This open upper end, as shown, is located at a level slightly below the open upper end of the cup, although its elevation may be at a higher point. The liquid conduit also has the lateral opening 15 in its side wall above and preferably adjacent to the bottom of the cup, the area of this opening being preferably less than the cross sectional area of the liquid conduit. The lower end portion 16 of the liquid conduit is bent to extend transversely beneath the bell 7 of the pressure transmitting conduit and in a direction such that its open end provides for the passage of liquid and air passing through the liquid conduit toward the raised portion of the bottom wall 9. In the present instance, I have shown two of these air replenishing devices, but it is apparent that one, two or even more air replenishing devices may be used, if desired.

With the arrangement as described and while the motor vehicle is moving and consequently the gasoline in the tank 1 is splashing or surging to and fro, the cup 13 of one of the air replenishing devices is filled by the gasoline owing to its disturbance and then as the surface of the gasoline surrounding the cup lowers the gasoline in the cup, as well as in the liquid conduit 14, seeks its level and drains downwardly. The gasoline drains out of the portion of the liquid conduit above the opening 15 before all of the gasoline in the cup drains down to this opening. Then upon draining of the gasoline from the cup air enters through the open upper end of the liquid conduit and is caught by the gasoline passing through the opening 15 and carried down into the liquid conduit and discharged through its open lower end and directed to the raised portion of the bottom wall 9 of the bell, after which the air may rise through the opening 10 into the bell 7.

The modified air replenishing device, as shown in Figure 3, comprises the cup 17, which is arranged and secured in the same manner as the cup 13 and the liquid conduit 18. This liquid conduit is formed of the upper and lower tubes 19 and 20, respectively, with the upper tube of smaller diameter than the lower tube and extending slightly into the upper end of the latter and providing a restricted annular opening for the passage of the gasoline from the cup 17 into the tube 20. The lower end portion of the tube 20 is arranged in the same manner as the lower end portion 16 of the liquid conduit 14 and the upper and lower ends of the upper tube 19 are both open so that air may pass through the open upper end of the upper tube 19 and downwardly therethrough and be carried into the lower tube 20 by the gasoline flowing from the cup 17, it being apparent that during the first part of the draining the gasoline in the upper tube 19 drains out before the gasoline drains completely out of the cup 17.

Figure 4 discloses another modification in which 21 is the cup and 22 the liquid conduit. The bottom of the cup is formed with the opening 23, while the side wall of the liquid conduit is formed with the opening 24 below and adjacent to the bottom of the cup.

Figure 5 shows an arrangement very similar to that of Figure 4 with the exception that the cup 25 communicates with the liquid conduit 26 through the tube 27 secured to and depending from the bottom of the cup and within the upper end of the liquid conduit, the latter being provided with the opening 28 in its side wall preferably below the lower open end of the tube 27.

In the modification shown in Figure 6, the liquid conduit 29 is formed with the restricted portion in the nature of a Venturi passageway 30 below and adjacent to the bottom of the cup 31 and the throat of the restricted or Venturi passageway has the opening 32.

Figure 7 discloses another modification in which the liquid conduit 33 has the opening 34 in its wall below and adjacent to the bottom of the cup 35 and this opening is in communication with the tube 36, which is bent to extend upwardly at the side of the cup 35 and has an open upper end at substantially the level of the open upper end of the cup.

The arrangement of the lower end portions of the liquid conduits shown in Figures 4, 5, 6 and 7 corresponds to that of Figures 1 and 2 and these modifications operate in a manner such that the gasoline flowing from the cups carry air downwardly through the liquid conduits for replenishing the pressure transmitting conduit.

The air replenishing device shown in Figure 8 has the liquid conduit 39 which extends air tight upwardly through the bottom of the cup 40 and this liquid conduit has an open upper end spaced above the bottom of the cup and at substantially a third of its height, the arrangement being such that upon draining of the gasoline from the cup the gasoline will have a whirling action with the apex of the whirl at the open upper end of the liquid conduit so that air will enter and be drawn down through the liquid conduit by the gasoline as it leaves the cup.

In all the above figures the hole in the liquid conduit may be circular or any other shape.

What I claim as my invention is:

1. In combination with a pressure gauge for measuring the depth of liquid in a tank, a pressure transmitting conduit extending from the gauge into the liquid in the tank and in communication with the tank at a pressure transmitting level in the tank, the pressure transmitting conduit having an opening in its lower end, a cup within the tank at an elevation above the pressure transmitting level for receiving liquid, and a liquid conduit extending from the cup to an elevation below the pressure transmitting level, the liquid conduit having a restricted opening near the bottom of the cup for the passage of liquid from the cup into the liquid conduit upon emptying of the cup, the liquid conduit also having an open upper end above the bottom of the cup for the passage of air into the liquid conduit upon emptying of the cup, the open upper end and the cup being above the liquid in the zone thereof at times during the disturbance of the liquid, whereby air may enter through the open upper end of the conduit and be carried through the liquid conduit by the liquid entering the liquid conduit from the cup, the liquid conduit further having an opening at its lower end for the passage of air passing through the liquid conduit and positioned beneath the pressure transmitting conduit whereby air may enter the latter.

2. In a liquid depth indicating device for vehicles, a liquid containing tank adapted to be carried by a vehicle, a hydrostatic gauge, a pressure transmitting conduit extending from the gauge into the liquid in the tank and having an opening in its lower end for placing the pressure transmitting conduit in communication with the liquid at a pressure transmitting level in the tank, a cup within the tank at an elevation above the pressure transmitting level for receiving liquid, and a liquid conduit extending from the cup to an elevation below the pressure transmitting level, the liquid conduit having a portion extending through and located above the bottom of the cup provided with an open upper end and an opening near the bottom of the cup, the open upper end and the cup being above the liquid in the zone thereof at times during the disturbance of the liquid, whereby air may enter through the open upper end of the liquid conduit upon emptying of the cup and be carried by the liquid passing from the cup into the liquid conduit, the liquid conduit having a bent lower end extending beneath the pressure transmitting conduit and provided with an opening for discharging air passing through the liquid conduit beneath the pressure transmitting conduit, whereby air may enter the latter through the opening in its lower end.

In testimony whereof I affix my signature.

WILLIAM E. BANDEMER.